United States Patent

Ball et al.

[11] Patent Number: 5,873,759
[45] Date of Patent: Feb. 23, 1999

[54] METHOD AND APPARATUS FOR MANUFACTURING CATHODE RAY TUBE DISPLAY DEVICES

[75] Inventors: Martin Huw Ball; Campbell Cromar, both of Gourock; Hugh James Kelly, Inverclyde, all of United Kingdom

[73] Assignee: International Business Machines Corporation, Armonk, N.Y.

[21] Appl. No.: 778,321

[22] Filed: Jan. 2, 1997

[30] Foreign Application Priority Data

Jun. 1, 1996 [GB] United Kingdom ............ 9611418

[51] Int. Cl.$^6$ .................................. H01J 9/42
[52] U.S. Cl. ............................... 445/3; 445/63
[58] Field of Search .................. 445/3, 4, 63, 64

[56] References Cited

U.S. PATENT DOCUMENTS 3,369,201  2/1968  Fiore et al. ............................ 445/3
4,374,451  2/1983  Miller .
4,497,848  2/1985  Baran ................................... 445/3

FOREIGN PATENT DOCUMENTS 2-87442    3/1990  Japan .
2 049 994  5/1979  United Kingdom .

Primary Examiner—Kenneth J. Ramsey
Attorney, Agent, or Firm—Daniel E. McConnell; George E. Grosser

[57] ABSTRACT

In a method and apparatus for manufacturing a cathode ray tube display device, the electrical characteristics and electron beam landing characteristics of a cathode ray tube are measured. A machine-readable recording the measured electrical and beam landing characteristics is then generated. The machine readable recording is then associated with the cathode ray tube. The cathode ray tube and the associated machine readable recording are then supplied to the display device production line.

10 Claims, 3 Drawing Sheets

METHOD AND APPARATUS FOR MANUFACTURING CATHODE RAY TUBE DISPLAY DEVICES

BACKGROUND OF THE INVENTION

1. Field of the Invention

The present invention relates to a method and apparatus for manufacturing cathode ray tube (CRT) display devices.

2. Background Description

A CRT display device, such as a television receiver or a computer visual display unit, comprises a CRT connected to associated drive circuitry all enclosed by a housing. The CRT comprises an electron gun assembly directed at a phosphor coated screen, a final anode adjacent the screen, and focus and grid electrodes adjacent the electron gun assembly. Electromagnetic deflection coils are provided in a yoke around the CRT between the screen and the electron gun assembly. The drive circuitry typically comprises a video amplifier connected to the electron gun assembly. In a typical colour CRT display, the electron gun assembly has three electron guns each assigned to a different one of the three primary colours, red, green and blue. Each electron comprises a thermionic cathode. The three electron guns are each connected to a different one of the three video channels in the video amplifier. The drive circuitry also includes line and frame deflection circuits for generating line and frame scan currents in a deflection yoke of the CRT. An Extra High Tension (EHT) voltage generator of the drive circuitry supplies DC drive voltages to the final anode, focus electrode and grid electrodes. In operation, the EHT generator generates a relatively high voltage between the final anode and the cathodes. Electrons from the cathodes are thus accelerated in beams from the cathodes to the screen. At the screen, the electrons excite the phosphors to generate a light output. The beams are scanned in a raster pattern by line and frame deflection fields produced via the line and frame deflection coils. The video amplifier modulates the electron beams in response to input red, green and blue video signals from an external video source such as a personal computer system unit. The raster pattern is synchronised to the input video by input synchronisation (sync) signals supplied to the deflection circuitry by the external video source.

The drive circuitry of some display devices comprises a display processor in the form of a micro-controller which is programmed to control, via digital to analog convertors the video and deflection sub-systems of the drive circuitry.

Conventionally, display devices as hereinbefore described are each assembled on a production line by connecting the CRT to the drive circuitry and then iteratively adjusting display operating parameters such as colour balance and picture geometry to specified production values prior to product shipment. The iterative adjustments consume significant manufacturing time, tending to increase overall product cost. It would be desirable, in the interests of reducing manufacturing time and thus cost, to integrate CRT test measurements from tests conducted by the CRT supplier into the adjustment process applied to the assembled display device prior to shipment.

U.S. Pat. No. 4,377,890 describes a method of CRT manufacture using a machine readable coded marking in which a unique, coded marking in applied to the exterior of a part of a CRT manufactured for the purpose of tracking the location of the part on a production line, adding additional parts to the parts, or testing an assembled CRT including the part.

SUMMARY OF THE INVENTION

In accordance with the present invention, there is now provided a method for manufacturing a cathode ray tube display device, the method comprising the steps of: measuring electrical characteristics and electron beam landing characteristics of a cathode ray tube; generating a machine-readable recording of the measured electrical and beam landing characteristics; associating the machine readable recording with the cathode ray tube.

The machine readable recording permits drive circuitry to be automatically tuned to the cathode ray tube during assembly of the cathode ray tube display.

Preferably, the associating step comprises the steps of: placing the machine readable recording on a label; and, securing the label to the cathode ray tube.

The associating step may alternatively comprise the steps of: applying a machine readable serial number to the cathode ray tube; and storing the machine readable recording in a look up table at an address corresponding to the serial number applied to the cathode ray tube.

In preferred embodiments of the present invention, there is further provided the steps of: connecting drive circuitry to the cathode ray tube; detecting the machine readable recording; retrieving the electrical and electron beam landing characteristics from the machine readable recording; and, tuning the drive circuitry as a function of the retrieved electrical and electron beam landing characteristics to optimise output from the cathode ray tube.

In other preferred embodiments of the present invention, there is provided the steps of: detecting the machine readable recording; retrieving the electrical and electron beam landing characteristics from the machine readable recording; selecting one or more electrical components for inclusion in the drive circuitry in dependence on the retrieved electrical and electron beam landing characteristics.

Viewing the present invention from another aspect, there is now provided apparatus for manufacturing a cathode ray tube display device, the apparatus comprising: means for measuring electrical characteristics and electron beam landing characteristics of a cathode ray tube; means for generating a machinereadable recording of the measured electrical and beam landing characteristics; means for associating the machine readable recording with the cathode ray tube.

Preferably, the associating means comprises: means for placing the machine readable recording on a label; and means for securing the label to the cathode ray tube.

The associating means may alternatively comprise means for applying a machine readable serial number to the cathode ray tube; and means for storing the machine readable recording in a look up table at an address corresponding to the serial number applied to the cathode ray tube.

In a preferred embodiment of the present invention there is provided means for connecting drive circuitry to the cathode ray tube; means for detecting the machine readable recording; means for retrieving the electrical and electron beam landing characteristics from the machine readable recording; and, means for tuning the drive circuitry as a function of the retrieved electrical and electron beam landing characteristics to optimise output from the cathode ray tube.

In another preferred embodiment of the present invention, there is provided means for detecting the machine readable recording; means for retrieving the electrical and electron beam landing characteristics from the machine readable recording; and means for selecting one or more electrical components for inclusion in the drive circuitry in dependence on the retrieved electrical and electron beam landing characteristics.

BRIEF DESCRIPTION OF THE DRAWINGS

A preferred embodiment of the present invention will now be described by way of example only with reference to the accompanying drawings, in which.

DETAILED DESCRIPTION OF PREFERRED EMBODIMENTS OF THE INVENTION

Figure 1:
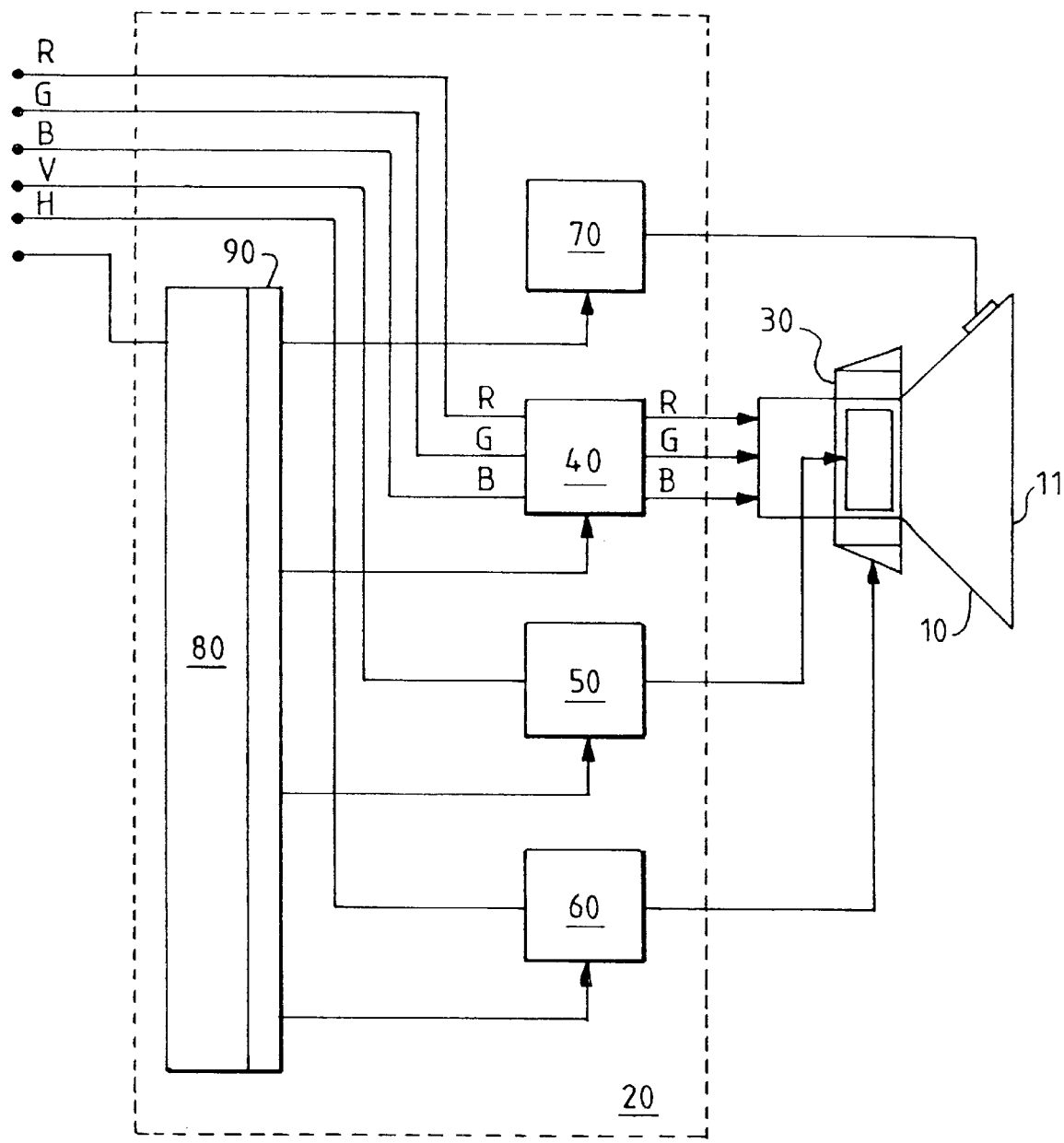
FIG. 1 is a block diagram of a CRT display.

Referring first to FIG. 1, an example of a CRT display device comprises a CRT 10 connected to associated drive circuitry 20. The CRT 10 comprises an electron gun assembly (not shown) directed at a phosphor coated screen 11, a final anode adjacent the screen 11, and focus and grid electrodes (not shown) adjacent the electron gun assembly. Line and frame electromagnetic deflection coils are provided in a yoke 30 around the CRT 10 between the screen 11 and the electron gun assembly. The drive circuitry 20 comprises a video amplifier 40 connected to the electron gun assembly. In a typical colour CRT display, the electron gun assembly has three electron guns each assigned to a different one of the three primary colours, Red, Green and Blue. Each electron comprises a thermionic cathode. The three electron guns are each connected to a different one of the three video channels in the video amplifier 40. The drive circuitry 20 also includes line and frame deflection circuits 50 and 60 for generating line and frame scan currents in the line and frame deflection coils. An Extra High Tension (EHT) voltage generator 70 of the drive circuitry 20 supplies DC drive voltages to the final anode, focus electrode and grid electrodes. In operation, the EHT generator 70 generates a relatively high voltage (typically 24 kV) between final anode and the cathodes. Electrons from the cathodes are thus accelerated in beams from the cathodes to the screen 11. At the screen 11, the electrons excite the phosphors to generate a light output. The beams are scanned in a raster pattern by line and frame deflection fields produced via the line and frame deflection coils. The video amplifier 40 modulates the electron beams in response to input red, green and blue video signals from an external video source such as a personal computer system unit. The raster pattern is synchronised to the input video by input line and frame synchronisation (sync) signals H and V supplied to the deflection circuits 50 and 60 by the external video source. The drive circuitry 20 further comprises a display processor 80 in the form of a micro-controller which is programmed to control, via digital to analog convertors 90 the video amplifier 40 and deflection circuits 50 and 60 of the drive circuitry 20.

Figure 2:
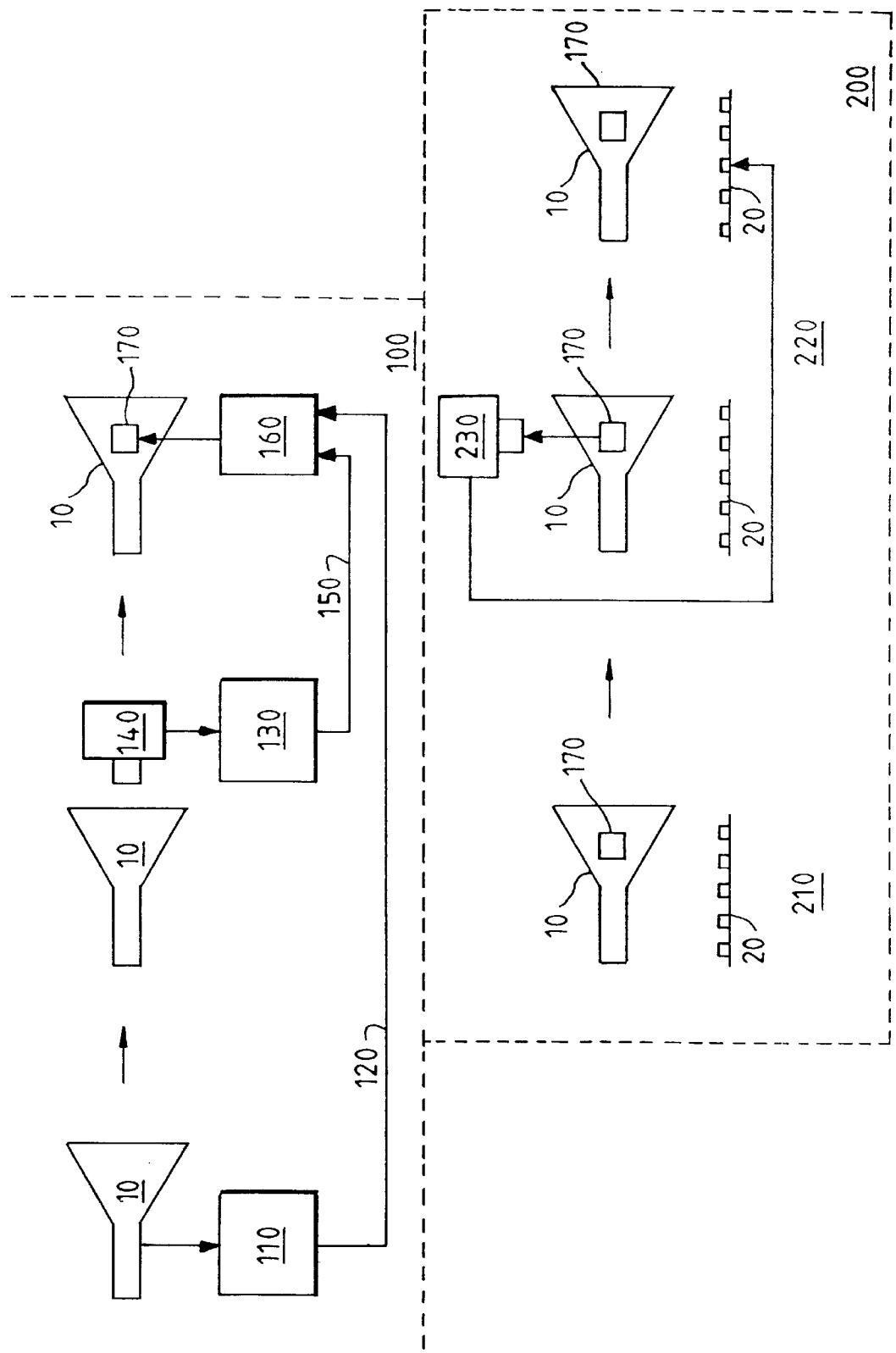
FIG. 2 is a block diagram of a CRT display production line embodying the present invention; and, FIG. 3 is a block diagram of a CRT display production line embodying the present invention.

Referring to FIG. 2, on the CRT production line 100 at the CRT manufacturer, the deflection yoke 30 is secured attached to the envelope of the CRT 10. However, in a first test step 110, prior to attachment of the yoke 30, a slave deflection yoke is temporarily passed onto the neck of the CRT 10. The slave yoke is employed to measure the electrical characteristics 120 of the CRT 10 and to thereby check conformance of the CRT 10 to specification. The measured electrical characteristics 120 thus obtained may vary from one CRT 10 to the next. In a second test step 130, a focus voltage is applied to the focus electrode of the CRT 10 and a camera 140 is employed to measure electron beam landing characteristics 150, including image centring and raster size, on the screen of the CRT 10. The CRT manufacturer determines based on the measured electrical characteristics and the measured beam landing characteristics whether the CRT is of acceptable quality for supply.

Conventionally, the measured beam landing and electrical characteristics are discarded by the CRT manufacturer after the above mentioned quality test. However, as shown in FIG. 2, in a preferred example of the present invention, the measured characteristics are recorded at 160. The recording is then delivered to the display manufacturer along with the corresponding shipment of CRTs. Each recording may be encoded onto a data carrier 170 such as a bar code which is fixed to the corresponding CRT 10. Alternatively, each recording may be stored in a look-up table against, for example, the serial number of the corresponding CRT 10.

At the display manufacturer, each CRT 10 from the CRT supplier is connected, on a display production line 200, to drive circuitry 20 to produce a CRT display as shown at 210. The connection stage 210 is followed in the production line 200 by an adjustment stage 220. The drive circuitry 20 may be supplied to the production in the form of a printed circuit board already populated with electrical components. Alternatively, assembly of the drive circuitry may be integral to the production line, with component pick and place and component soldering stages located upstream of the connection and adjustment stages. At the adjustment stage 220, the drive circuitry 20 is tuned to the connected CRT 10 to optimise performance the display. Such tuning typically includes adjustment of video cut-off levels and video gains in the video amplifier; adjustment of grid 2 and focus voltages in the EHT generator; and, adjustment of around 15 geometric parameters such picture height, width, and centring in the line and frame deflection circuits. Conventionally, the tuning adjustments are performed manually. However, in preferred examples of the present invention as shown in FIG. 2, the tuning adjustments for each display are performed automatically based on the recorded characteristics 170 corresponding to the CRT 10 incorporated in the display. Specifically, the production line 200 comprises a computer controlled adjustment station 220 automatically tuning each assembled display device to produce the desired output performance. The adjustment station programmes the display processor 80 of the display device to set the outputs of DACs 90 in the display drive circuitry to levels determined by the recorded characteristics corresponding to the CRT connected to the drive circuitry.

In a preferred example of the present invention, in which the recorded characteristics are attached to each CRT in the form of a machine readable label 170 such as a bar code, the adjustment station comprises a sensor 230 such as a bar code reader for reading the recorded characteristics from the CRT 10 of the display device under test. The adjustment station 220 then calculates values for programming the display processor 80 of the display device based on data read directly from the label 170. In another preferred embodiment of the present invention, in which the recorded characteristics are stored in a look up table provided by the CRT manufacturer with the corresponding batch of CRTs, the adjustment station 220 is granted access to the look-up table. Each of the batch of CRTs carries a serial number encoded in machine readable form. The adjustment station 220 is provided with a sensor for detecting the serial number. On detection of each serial number, the adjustment station 220 selects the corresponding recorded characteristics from the look-up table and programs the display processor of the display device containing the corresponding CRT 10 accordingly.

Figure 3:
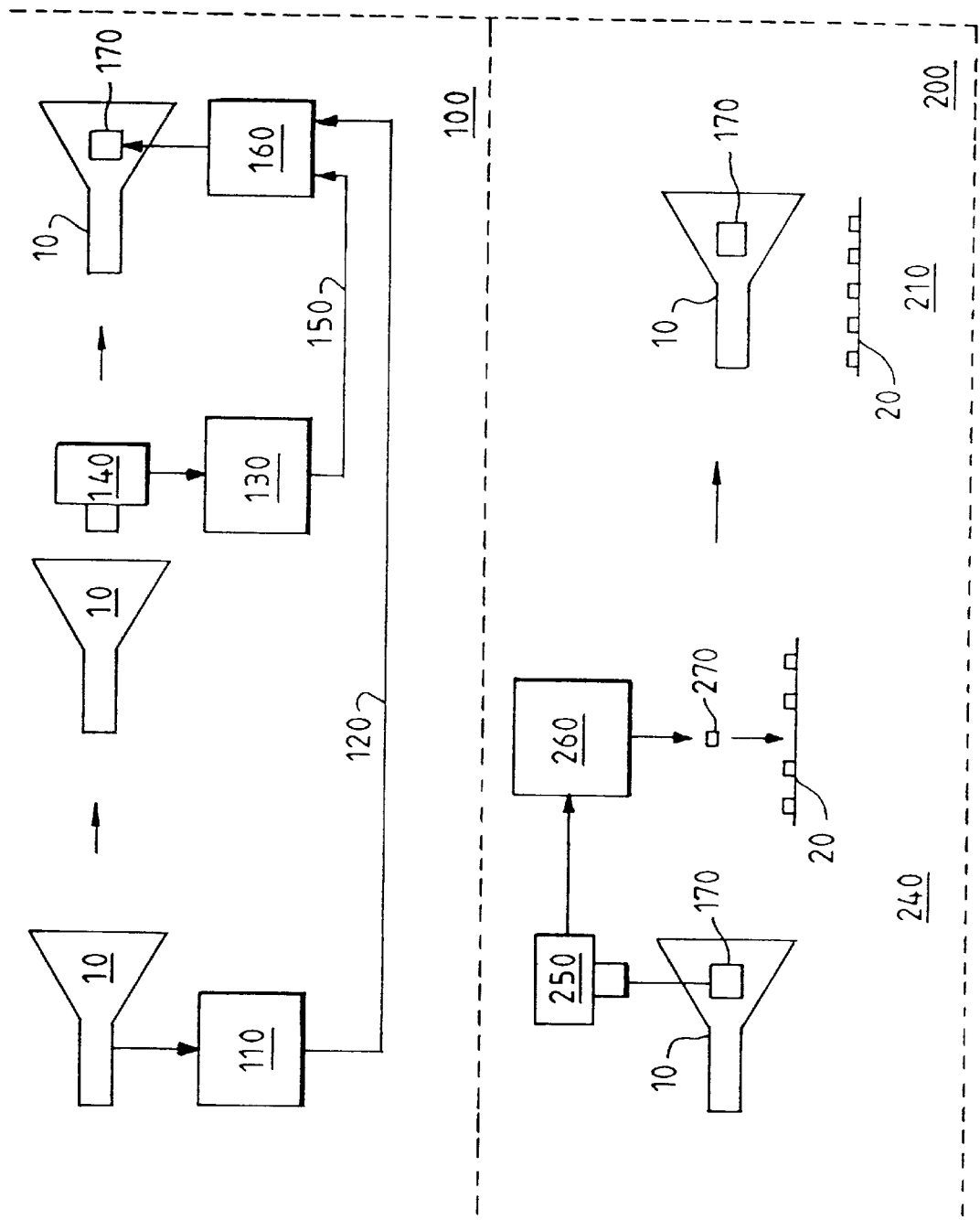

Referring now to FIG. 3, in another embodiment of the present invention, assembly of the drive circuitry 20 is integral to the display production line. Specifically, the production line comprises a component pick and place stage 240 for populating the drive circuitry 20 with electrical components 270. The pick and place stage 240 comprises a computer 260 for controlling selection of components for placement in the drive circuitry 20 of each display device in response to the recorded characteristic associated with the corresponding CRT 10. Specifically, the computer 260 obtains the recorded characteristics of the CRT either directly from a machine readable label 170 on the CRT 10 via a reader 250 as hereinbefore described, or from the aforementioned look-up table, depending on the coding format employed. The drive circuitry 20 of the display device is arranged such that the control levels are set by hard-wired resistor values rather than by DACs as in the previously described embodiments. For each control level, the computer selects the appropriate resistor value (or values as circuit topology dictates) for insertion in the drive circuitry 20 based on the recorded characteristics of the CRT 10. The drive circuitry 20 populated with appropriate components is then passed with the corresponding CRT to the connection stage 210 to produce the display device. The adjustment stage (not shown in FIG. 3) is then free to perform only fine tuning of the display device performance. Because, in this embodiment of the present invention, DACs are not required for tuning purposes, a significant cost saving may be achieved in terms of both programming time and component cost.

Preferred embodiments of the present invention have been hereinbefore described with reference to a colour CRT display. It will now however be appreciated that the present invention is equally applicable to manufacture of monochrome CRT displays.

What is claimed is:

1. A method for manufacturing a cathode ray tube display device, the method comprising the steps of: measuring electrical characteristics and electron beam landing characteristics of a cathode ray tube; generating a machine-readable recording of the measured electrical and beam landing characteristics; associating the machine readable recording with the cathode ray tube.

2. A method as claimed in claim 1, wherein the associating step comprises the steps of: placing the machine readable recording on a label; and, securing the label to the cathode ray tube.

3. A method as claimed in claim 1, wherein the associating step comprises the steps of: applying a machine readable serial number to the cathode ray tube; and storing the machine readable recording in a look up table at an address corresponding to the serial number applied to the cathode ray tube.

4. A method as claimed in claim 1 comprising the steps of: connecting drive circuitry to the cathode ray tube; detecting the machine readable recording; retrieving the electrical and electron beam landing characteristics from the machine readable recording; and, tuning the drive circuitry as a function of the retrieved electrical and electron beam landing characteristics to optimise output from the cathode ray tube.

5. A method as claimed in claim 1 comprising the steps of: detecting the machine readable recording; retrieving the electrical and electron beam landing characteristics from the machine readable recording; selecting one or more electrical components for inclusion in the drive circuitry in dependence on the retrieved electrical and electron beam landing characteristics.

6. Apparatus for manufacturing a cathode ray tube display device, the apparatus comprising: means for measuring electrical characteristics and electron beam landing characteristics of a cathode ray tube; means for generating a machine-readable recording of the measured electrical and beam landing characteristics; means for associating the machine readable recording with the cathode ray tube.

7. Apparatus as claimed in claim 6, wherein the associating means comprises: means for placing the machine readable recording on a label; and means for securing the label to the cathode ray tube.

8. Apparatus as claimed in claim 6, wherein the associating means comprises means for applying a machine readable serial number to the cathode ray tube; and means for storing the machine readable recording in a look up table at an address corresponding to the serial number applied to the cathode ray tube.

9. Apparatus as claimed in claim 6 comprising: means for connecting drive circuitry to the cathode ray tube; means for detecting the machine readable recording; means for retrieving the electrical and electron beam landing characteristics from the machine readable recording; and, means for tuning the drive circuitry as a function of the retrieved electrical and electron beam landing characteristics to optimise output from the cathode ray tube.

10. Apparatus as claimed in claim 6 comprising: means for detecting the machine readable recording; means for retrieving the electrical and electron beam landing characteristics from the machine readable recording; and means for selecting one or more electrical components for inclusion in the drive circuitry in dependence on the retrieved electrical and electron beam landing characteristics.

* * * * *